United States Patent [19]

Roberts et al.

[11] Patent Number: 5,340,473
[45] Date of Patent: Aug. 23, 1994

[54] GAS/LIQUID MIXING APPARATUS

[75] Inventors: Russell D. Roberts, Easton; Bruce L. Brandenburg, Rib Mountain, both of Wis.; Claude E. Ellis, Walnut, Calif.

[73] Assignee: Zimpro Environmental, Inc., Rothschild, Wis.

[21] Appl. No.: 166,064

[22] Filed: Dec. 14, 1993

[51] Int. Cl.$^5$ .............................................. B01D 35/18
[52] U.S. Cl. ................... 210/177; 210/198.1; 261/153; 261/DIG. 75
[58] Field of Search ........................ 210/177, 198.1; 261/153, DIG. 75

[56] References Cited

U.S. PATENT DOCUMENTS

| | | | |
|---|---|---|---|
| 2,932,613 | 4/1960 | Huesler et al. | 210/63 |
| 3,844,948 | 10/1974 | Burke et al. | 210/177 |
| 3,907,678 | 9/1975 | Pradt et al. | 210/63 |
| 4,384,959 | 5/1983 | Bauer et al. | 210/739 |
| 4,721,575 | 1/1988 | Binning et al. | 210/177 |
| 4,793,919 | 12/1988 | McCorquodale | 210/177 |

*Primary Examiner*—Neil McCarthy
*Attorney, Agent, or Firm*—Tipton L. Randall

[57] ABSTRACT

An apparatus for mixing pressurized air with pressurized waste liquor at the inlet of a wet oxidation system heat exchanger device is disclosed. The apparatus is a T-shaped piping member with an inline first inlet and outlet and a second inlet oriented at about a right angle to said inline first inlet. The outlet is connected to an inlet tube of a tube and shell heat exchanger. A conduit supplies a pressurized waste liquor stream to the piping member through the second inlet. An oxygen-containing gas supply conduit, with circumferential sealing means, extends from exterior the T-shaped member, through the first inlet and terminates at a point beyond the intersection of the first and second inlets. The circumferential sealing means seals to the first inlet. The liquor entering the T-shaped member is heated to a selected elevated temperature prior to contacting a pressurized oxygen-containing gas supplied from the gas supply conduit.

5 Claims, 1 Drawing Sheet

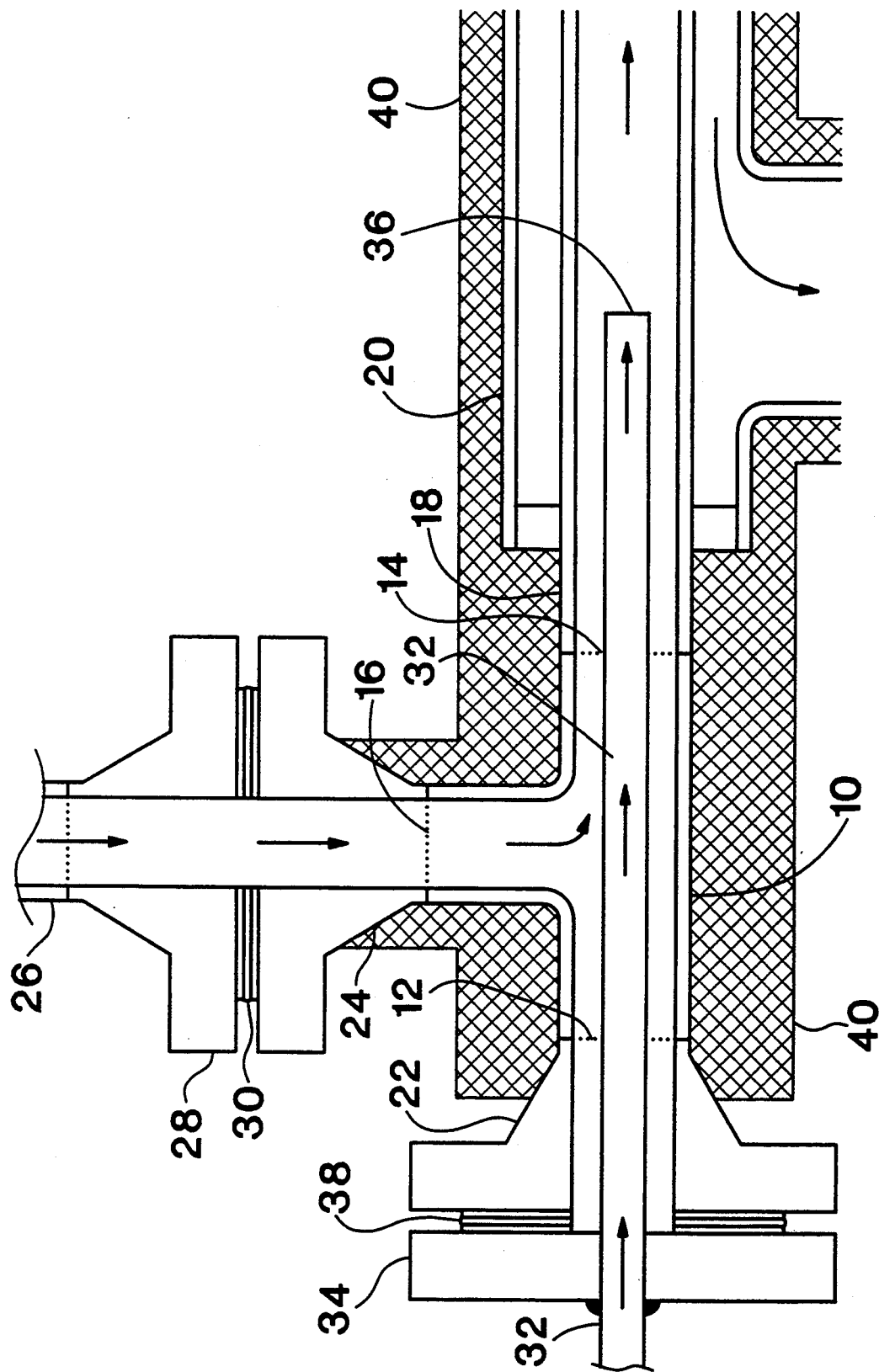

GAS/LIQUID MIXING APPARATUS

BACKGROUND OF THE INVENTION

1. Field of the Invention

This invention relates to an apparatus for mixing gas and liquid phases, and more particularly, to an apparatus for mixing pressurized air with pressurized waste liquor at the inlet of a wet oxidation system heat exchanger device.

2. Description of Related Art

In the continuous flow wet oxidation of aqueous waste liquors, the general practice is to pressurize the waste liquor and combine it with a pressurized oxygen-containing gas, such as air, to give a pressurized gas/liquor mixture. The mixture is then heated to a selected temperature for a certain time period in a pressure vessel to effect wet oxidation treatment. Heat energy is recovered in a process heat exchanger where the raw gas/liquor mixture is heated by the hot oxidation mixture exiting from the pressure vessel. Compared to liquor alone the gas/liquor mixture provides improved heat transfer in the tube and shell heat exchangers commonly employed in continuous flow wet oxidation systems.

Huesler et al. in U.S. Pat. No. 2,932,613 disclose pumping liquor through a first heat exchanger, the adding compressed air to the liquor, with this mixture flowing on to additional heat exchangers in the wet oxidation system. No details of the apparatus for performing this air addition are provided.

In U.S. Pat. No. 3,907,678 Pradt et al. disclose adding air before and after a heat exchanger to prevent polymerization of wastewater components in the wet oxidation system. Again, no details of the apparatus for performing this air addition are provided.

Bauer et al. in U.S. Pat. No. 4,384,959 describe adding inert dilution gas a various points to a pure oxygen wet oxidation system. Likewise, no details of the apparatus for performing this gas addition are provided.

In wet oxidation treatment, certain waste liquors mixed with oxygen-containing gas, such as air, are prone to form viscous solids in the piping prior to the mixture entering the system's heat exchanger. These solids can plug the inlet piping and shut down the continuous flow system. The waste liquor is stable in the absence of oxygen (air), even when heated to the boiling point, about 100° C.

To overcome this operational problem, applicants have invented an air/liquor mixing apparatus which introduces the pressurized air into the pressurized waste liquor at the entrance to the heat exchanger, such that the liquor has been heated to an elevated temperature before contacting the oxygen in the air. No additional preheating device for the liquor is required. The mixing apparatus attaches to the tube inlet of a tube and shell heat exchanger, is easily disassembled for inspection and cleaning, and can be designed to provide air delivery at a selected position relative to the inlet point of waste liquor.

SUMMARY OF THE INVENTION

The invention is an apparatus for adding an oxygen-containing gas to a liquor entering a tube and shell heat exchanger device comprising a T-shaped piping member of selected interior diameter, with an inline first inlet and outlet and a second inlet oriented at about a right angle to said inline first inlet. The piping member outlet is connected inline to an inlet tube of a tube and shell heat exchanger. First and second sealing means are attached to said first and second inlets respectively, the second sealing means forming a fluid-tight seal with a conduit supplying a pressurized waste liquor stream to the piping member through the second inlet. An oxygen-containing gas supply conduit, having a selected exterior diameter less than the selected interior diameter of the T-shaped piping member, and having a circumferential sealing means therearound, extends from exterior the T-shaped member, through the inline first inlet and terminates at a point beyond the intersection of the first and second inlets. The circumferential sealing means forms a fluid-tight seal with the first sealing means of the first inlet, whereby the liquor entering the T-shaped member is heated to a selected elevated temperature prior to contacting a pressurized oxygen-containing gas supplied from the gas supply conduit therein.

BRIEF DESCRIPTION OF THE DRAWING

The FIGURE is a cross sectional view of the claimed apparatus of the invention.

DESCRIPTION OF THE PREFERRED EMBODIMENTS

Referring to the FIGURE, the apparatus comprises a T-shaped piping member 10 of a selected interior diameter. The piping member has an inline first inlet 12, an inline first outlet 14 and a second inlet 16 oriented at a right angle to the inline first inlet. The outlet 14 is connected to the inlet tube 18 of a tube and shell heat exchanger, well known in the industry. The heat exchanger has an exterior shell 20 which carries the oxidized air/liquid mixture from the system. The tube 18 preferably has the same internal diameter as the piping member 10 and is connected by welding the two together.

The inlets each have sealing means attached to them. The first inlet 12 has a flange 22 attached, while the second inlet 16 likewise has a flange 24 attached thereto. Pressurized waste liquor is supplied to the piping member 10 via a conduit 26 fitted with a flange 28 which aligns with the inlet flange 24 and forms a seal with the aid of a gasket 30. The inside diameter of the liquor supply conduit 26 matches that of the second inlet 16 and inlet flange 24.

Air is supplied to the mixing apparatus via an air supply conduit 32 which has an exterior diameter less than the internal diameter of the piping member 10 to allow for the flow of liquid between these members. Preferably the exterior diameter of the air supply conduit 32 is equal to or less than one half the diameter of the piping member 10. The air conduit extends from exterior the T-shaped piping member 10, through the first flange 22 and the first inlet 12 and terminates at a point beyond the intersection of the first and second inlets. The smaller external diameter of air supply conduit 32 provides an annular space through which the raw liquor enters the inlet tube 18 of the heat exchanger. The air supply conduit 32 has a circumferential sealing means in the form of a blind flange 34 which is welded to the outside of the conduit. This flange 34 is secured on the conduit so as to position the conduit end 36 at the desired location beyond the inlet intersection point when the blind flange 34 is sealed against the first inlet flange 22. A gasket 38 ensures a fluid-tight seal between the two flanges. An insulating material 40 covers the heat exchanger, the piping member 10 and portions of the inlet flanges as shown. The insulation allows the piping member and flanges to be warmed by heat from the oxidized gas/liquor mixture in the shell portion of the heat exchanger. This in turn transfers heat to the raw liquor entering from the conduit 26.

The mixing apparatus thus allows the pressurized waste liquor to enter the piping member 10 and flow through the annular space between the air supply conduit 32 and the heat exchanger inlet tube portion 18, raising the liquor to the desired reaction temperature, before the liquor contacts the pressurized air entering from the end 36 of the inlet tube. This prevents the formation of viscous solids which occurs when liquor contacts air before the liquor is heated to the proper reaction temperature. In addition, the configuration of the mixing apparatus allows the air supply conduit 32 to be removed by simply disconnecting the blind flange 34 from the inlet flange 22 and withdrawing the supply conduit. Thus the inlet and piping member can be inspected and cleaned with ease. Further, the point of air addition to the system can be adjusted merely by lengthening or shortening the air conduit which extends into the inlet of the heat exchanger.

While the invention has been particularly shown and described with reference to a preferred embodiment thereof, it will be understood by those skilled in the art that various changes in form and details may be made therein without departing from the spirit and scope of the invention.

We claim:

1. An apparatus for adding an oxygen-containing gas to a liquor entering a tube and shell heat exchanger device comprising;

a T-shaped piping member of selected interior diameter, with inline first inlet and outlet and a second inlet oriented at about a right angle to said inline first inlet, said piping member outlet connected inline to an inlet tube of a tube and shell heat exchanger;

first and second sealing means attached to said first and second inlets respectively, said second sealing means forming a fluid-tight seal with a conduit supplying a pressurized waste liquor stream to said piping member through said second inlet;

an oxygen-containing gas supply conduit having a selected exterior diameter less than said selected interior diameter of said T-shaped piping member, said gas supply conduit having a circumferential sealing means therearound, said gas supply conduit extending from exterior said T-shaped member, through said inline first inlet and terminating at a point beyond the intersection of said first and second inlets, said circumferential sealing means forming a fluid-tight seal with said first sealing means of said first inlet, whereby said liquor entering said T-shaped member is heated to a selected elevated temperature prior to contacting a pressurized oxygen-containing gas supplied from said gas supply conduit therein.

2. An apparatus according to claim 1 wherein said first and second inlet sealing means is a flange connection with a gasket.

3. An apparatus according to claim 1 wherein said gas supply conduit circumferential sealing means is a blind flange welded to said conduit.

4. An apparatus according to claim 1 wherein said piping member outlet and said tube inlet of said heat exchanger have the same internal diameter.

5. An apparatus according to claim 1 wherein said exterior diameter of said oxygen-containing gas supply conduit is equal to or less than one half the interior diameter of said piping member.

* * * * *